United States Patent [19]
Jeppesen, III et al.

[11] Patent Number: 5,117,428
[45] Date of Patent: May 26, 1992

[54] SYSTEM FOR MEMORY DATA INTEGRITY

[75] Inventors: James H. Jeppesen, III, El Toro; Bruce E. Whittaker, Mission Viejo, both of Calif.

[73] Assignee: UNISYS Corporation, Blue Bell, Pa.

[21] Appl. No.: 440,821

[22] Filed: Nov. 22, 1989

[51] Int. Cl.⁵ .............................................. G06F 11/10
[52] U.S. Cl. .................................... 371/51.1; 371/40.4
[58] Field of Search ..................... 371/40.4, 50.1, 51.1

[56] References Cited
U.S. PATENT DOCUMENTS

| | | | |
|---|---|---|---|
| 4,450,562 | 5/1984 | Wacyk | 371/51.1 |
| 4,685,088 | 8/1987 | Iannucci | 365/230.02 |
| 4,809,279 | 2/1989 | Kim et al. | 371/51.1 |
| 4,928,281 | 5/1990 | Kurosawa et al. | 371/51.1 |

FOREIGN PATENT DOCUMENTS

| | | | |
|---|---|---|---|
| 0011699 | 2/1981 | Japan | 371/51.1 |
| 1439333 | 6/1976 | United Kingdom | 371/40.4 |

*Primary Examiner*—Jerry Smith
*Assistant Examiner*—Henry C. Lebowitz
*Attorney, Agent, or Firm*—Alfred W. Kozak; Mark T. Starr

[57] ABSTRACT

An expandable memory structure, both vertically and laterally, which uses a plurality of uniformly sized and duplicated chips which includes parity check functionality using an auxiliary parity memory chip of the same type and size. Selection circuitry permits choice of format for odd or even parity.

16 Claims, 9 Drawing Sheets

5,117,428

SYSTEM FOR MEMORY DATA INTEGRITY

FIELD OF THE INVENTION

This disclosure relates to providing data integrity for memory systems and particularly for the use of parity checking of data stored and retrieved from memory systems.

CROSS REFERENCES TO RELATED APPLICATIONS

This disclosure relates to the following concurrently pending applications by the inventors James H. Jeppesen, III and Bruce E. Whittaker.

a patent application entitled "Width Expansible Memory Integrity Structure", filed Nov. 22, 1989 as U.S. Ser. No. 441,128; and a patent application entitled "Multiple Memory Bank Parity Checking System" filed Nov. 22, 1989 as U.S. Ser. No. 440,558, now U.S. Pat. No. 5,052,001.

BACKGROUND OF THE INVENTION

In the architecture of computer systems, a major module is the memory system which works in conjunction with the processor and which memory system holds and supplies the data and instructions necessary to the operation of the system. One such type of memory system involves the use of PROM memory modules which involve programmable read only memory units which are generally used to hold "fixed" data for use of the computer system.

The information stored in the PROM memory is critical to the integrity of system operation and such system operation can run amok should the data from the PROM memory be corrupted or altered.

Such memory units are also made up of ROM modules which involve read-only memory and which also hold significant "fixed" data.

Examples of important and significant data which may reside in a PROM or a ROM memory system are such items as:

(i) low level "bootstrap" (start-up) program code which is used to initialize a system;

(ii) specialized and unique information for system identification and configuration functions;

(iii) data integrity value information such as encryption or decryption keys.

The integrity of the ROM/PROM memory data is especially critical since a system may not yet be sufficiently initialized (up) enough at the period of initialization before other higher and more sophisticated levels of error detection are functioning operationally.

The generally common method of error detection in memory systems, whether RAMs (random access memories) or ROMs/PROMs, is the use of the "parity" data system. Parity is a method whereby "extra" data bits are stored along with the real data bits. These extra bits, called "parity bits", contain a value that is based upon the value of the actual data package under consideration. At such time as the data information is read out from memory, the parity bits are read out as well.

The parity value of the "actual data read out" is recalculated from the real data bits (via a parity logic circuit) and the calculated parity value is then compared to the parity bit or bits read out from the parity memory. If these two values are equal, then there is a high probability that the actual data read-out is valid and free from errors that may have been induced during the writing-in, the storage of, and the reading-out of the data in the memory subsystem.

In the physical hardware implementation of a parity checking system for memory, several factors are extant:

(a) extra storage elements (PROM chips) are required to store the parity bit(s);

(b) a means of collecting and checking out the parity bits must be added to the system.

One example of a parity check system is shown in U.S. Pat. No. 4,809,279 which is commonly assigned to the same ownership as this instant application. This type system is limited to only one type of parity operation (odd. parity) while the instant application provides a choice factor for using odd or even parity.

In the present day commercial marketplace, standard parity-checking integrated circuit chips (IC's) are available. These devices use one parity bit for each eight bits of information (data). Thus it can be realized that one bit of extra memory must be added to the system for each eight bits (data) of system memory width. Now since most functioning practical systems have requirements for memory much wider than eight bits, this can lead to problems involving additional cost consideration and space requirements in the system.

Another complication to the use of parity systems in PROM memory structures is that standard industry PROM chips are usually made eight bits wide in configuration. Even if it were possible to find a one-bit wide PROM, there is still the consideration that it is highly desirable to build a memory structure using only "one type" of memory chip rather than a mixture of different types of chips.

Because of this impracticability, it would appear that few systems use data integrity schemes for PROM memory data. Thus the architectural arrangement presented in this disclosure provides a means for reducing the costs of parity schemes in PROM memory systems and permits uniformity of PROM module units and, most importantly, permits means for insuring the integrity of the system by permitting the detection of data corruption errors in the PROM memory banks. Because of the use of fewer memory chips and the uniformity of using the same type of memory chips, it is possible to provide considerable efficiencies in operation and cost reduction.

SUMMARY OF THE INVENTION

In order to accrue the benefits of uniformity of memory modules and low cost efficiencies, a memory subsystem for storing multiple numbers of data bytes is connected to cooperate with a parity storage memory such that each byte of data storage in the data storage memory has a corresponding parity bit stored in the parity storage memory. When the data storage memory is addressed to access and read out a byte of data, then simultaneously the address will access the corresponding parity bit from the parity storage memory. Then a parity checking logic module can be used to receive the read-out data from the data storage memory in order to calculate its parity and then to compare the calculated parity with the predetermined parity value received from the parity storage memory. Should any disparity occur between the two compared parity bits, then an error signal will be generated for use in the system for subsequent corrective action.

The data storage memory may be extended "laterally" with a sequence of memories using duplicate modules of the first data storage memory while the same parity storage memory can be utilized to provide a parity bit for any data byte accessed from any one of the lateral memory modules for detection of any error occurrences. This provides for wider words of real data which can be addressed in the memory structure.

Likewise, banks of "vertically" stacked memory modules of a uniform type can be architecturally organized to expand the depth of memory locations while at the same time permitting a single parity storage memory to be used to store and subsequently provide the appropriate parity bit for any data byte accessed which then can be used in the parity checking logic unit for checking the calculated parity against the parity preset in the parity storage memory. This provides for greater addressability, allowing more data words of specified width to be available.

DESCRIPTION OF THE PREFERRED EMBODIMENT

Figure 1:
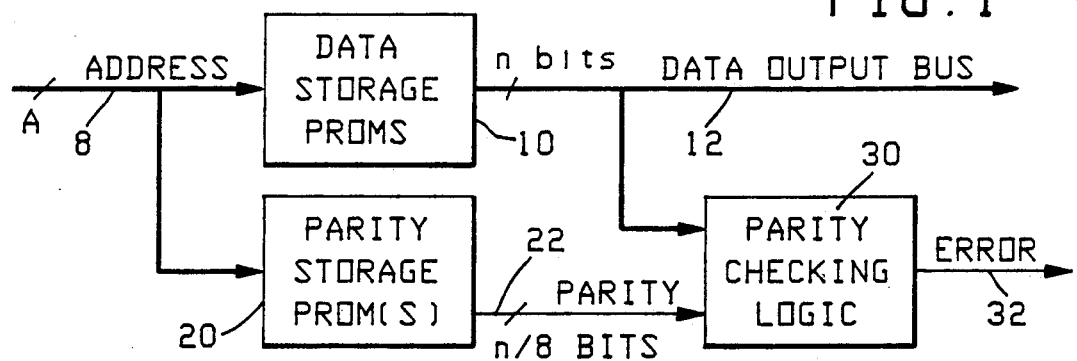
FIG. 1 is a block diagram showing the basic structure of a data storage memory working in cooperation with a parity storage memory to provide information to a parity checking logic unit in order to verify the integrity of each data byte which is accessed from the data storage memory.

Referring to FIG. 1, the basic architectural structure for the disclosed system of parity checking is shown having a block of data storage PROMs 10 for storing data bytes and being addressed by the address bus 8 which also addresses the block of parity storage PROM(s) 20. The accessed data byte from the data storage memory 10 is read out and placed on the data bus 12 which has one bus leg to transmit the read-out data and another bus leg which connects to the parity checking logic unit 30. The parity logic unit 30 also receives the parity information on line 22 and functions to compare the predetermined parity value from the parity storage unit 20 with the recalculated parity value of the data read out on data bus 12.

If the two parities agree in value, then no error signal is generated. However, if there is a disagreement between the two parity values, then an error signal is generated into the system for corrective action.

The data storage block 10 represents a standard array of storage chips. The only unusual aspect for a PROM memory system is that PROM chips are usually eight bits wide, whereas RAM (random access memory) chips are usually one bit wide.

The parity checking logic block 30 of FIG. 1 can use standard industry parity checker chips, typically those made by the Fairchild Camera and Instrument Company, Digital Products Division, whose address is 333 Western Ave., South Portland, Me., and known as type 74280. These chips will verify one bit of parity for each eight bits of data (byte).

The parity storage block 20, which may consist of one or more auxiliary PROMs, is an integral part of the described memory system.

For each "byte" (8 bits) of real data stored in the storage memory 10, there must be one bit of parity data stored in the parity storage auxiliary memory 20. In order to effectuate the cost reduction of this parity storage, - that is to say, the number of extra PROM chips required for parity, it would be desirable to use the parity storage memory as a uniform type of module similar to that of the data storage memory since virtually all industry PROM chips are eight bits wide.

It might be noted also that PROM chips also come in various depths, —that is to say, the number of 8-bit bytes which are stored in the particular chip. In this disclosure, the depth of the chips described will be assumed to be "N" thousand bytes deep, so that the value of "N" will follow the generally used pattern of a PROM having thousands of data bytes.

In FIG. 1a, the width of the data output bus 12 is "n" bits where "n" is the number of bits in a real data word (byte). The output parity line 22 of FIG. 1 is shown as having output of n/8 parity bits so that if a data word of eight bits (n=8) is used, the line 22 carries one parity bit. If "n" were 16 bits (data word), then output 22 would encompass two bits using two output lines.

Figure 2:
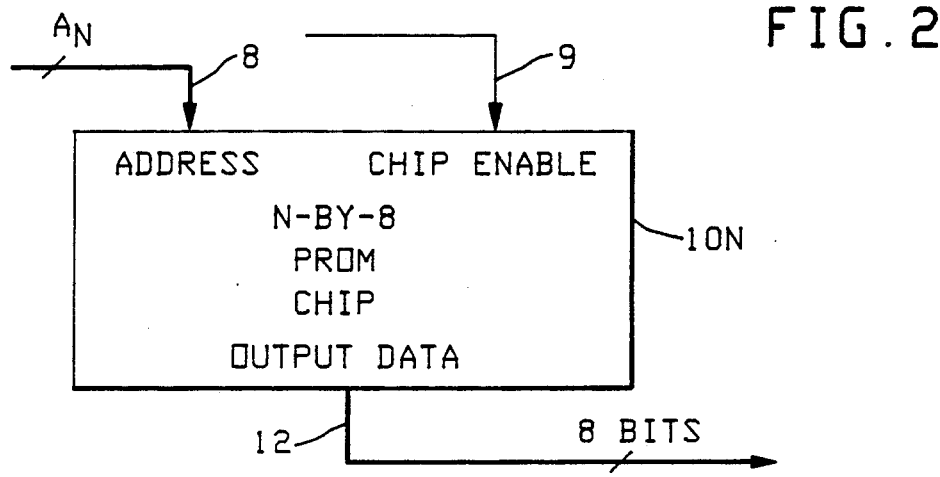
FIG. 2 is a schematic drawing of a typical memory PROM chip showing the address bus to the chip, the chip enable signal line, and the output data bus.

FIG. 2 shows a typical PROM chip 10N which is "N" thousand bytes deep and which can be designated as having a density of N×8, where "n" is eight bits. It will be seen that the address bus 8 will have a width of lines $A_N$ which is dependent upon the chip depth N. The chip enable line 9 enables data to be read out of the PROM 10N. If no connection is shown to the chip enable line, it is assumed that the PROM chip is continuously enabled.

The output data bus 12 is seen to be eight bits wide in order to carry the value of the accessed data byte of eight bits.

Figure 3:
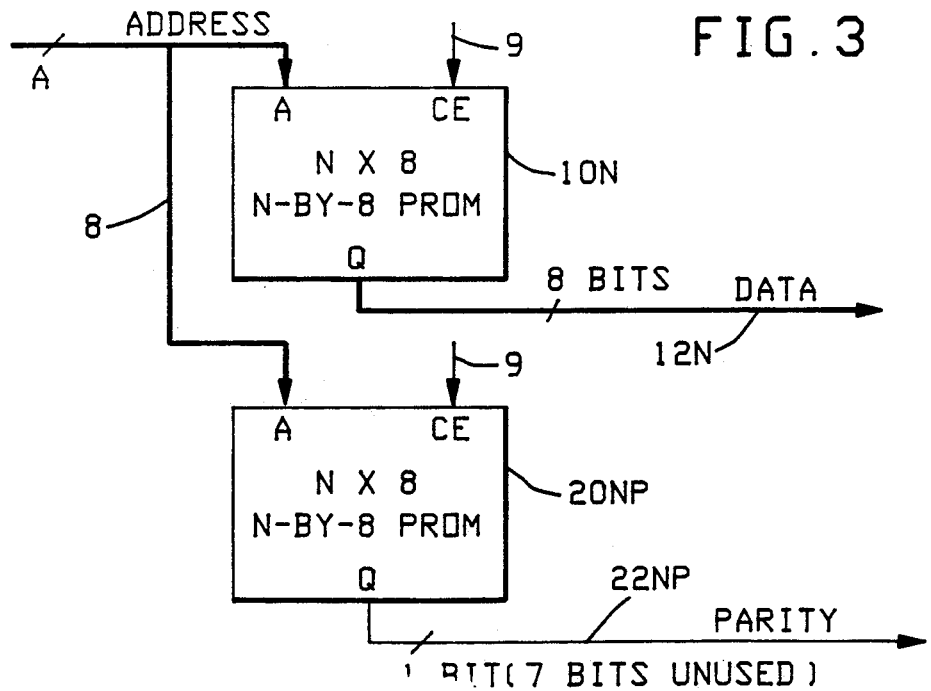
FIG. 3 is a block diagram showing the minimum structure required to implement the parity checking memory system.

Referring to FIG. 3, there is shown a schematic drawing of the minimum structure for a PROM memory system holding data which is eight bits wide on chip 10N. The chip 10N is designated as N thousand bytes deep. The output of the PROM 10N is shown at Q having an output data bus of eight bits and designated as bus 12N.

Each data byte in the data PROM 10N has a corresponding parity bit located in the parity PROM 20NP. The PROM 20NP is an extra auxiliary PROM chip added to hold the parity bits. In this case, only one line of output is present from the parity PROM 20NP while seven bits of output are unused. The output parity bit is shown on line 22NP. In this minimum structure, the scheme is similar to other parity techniques and does not present any saving in hardware.

Figure 4A:
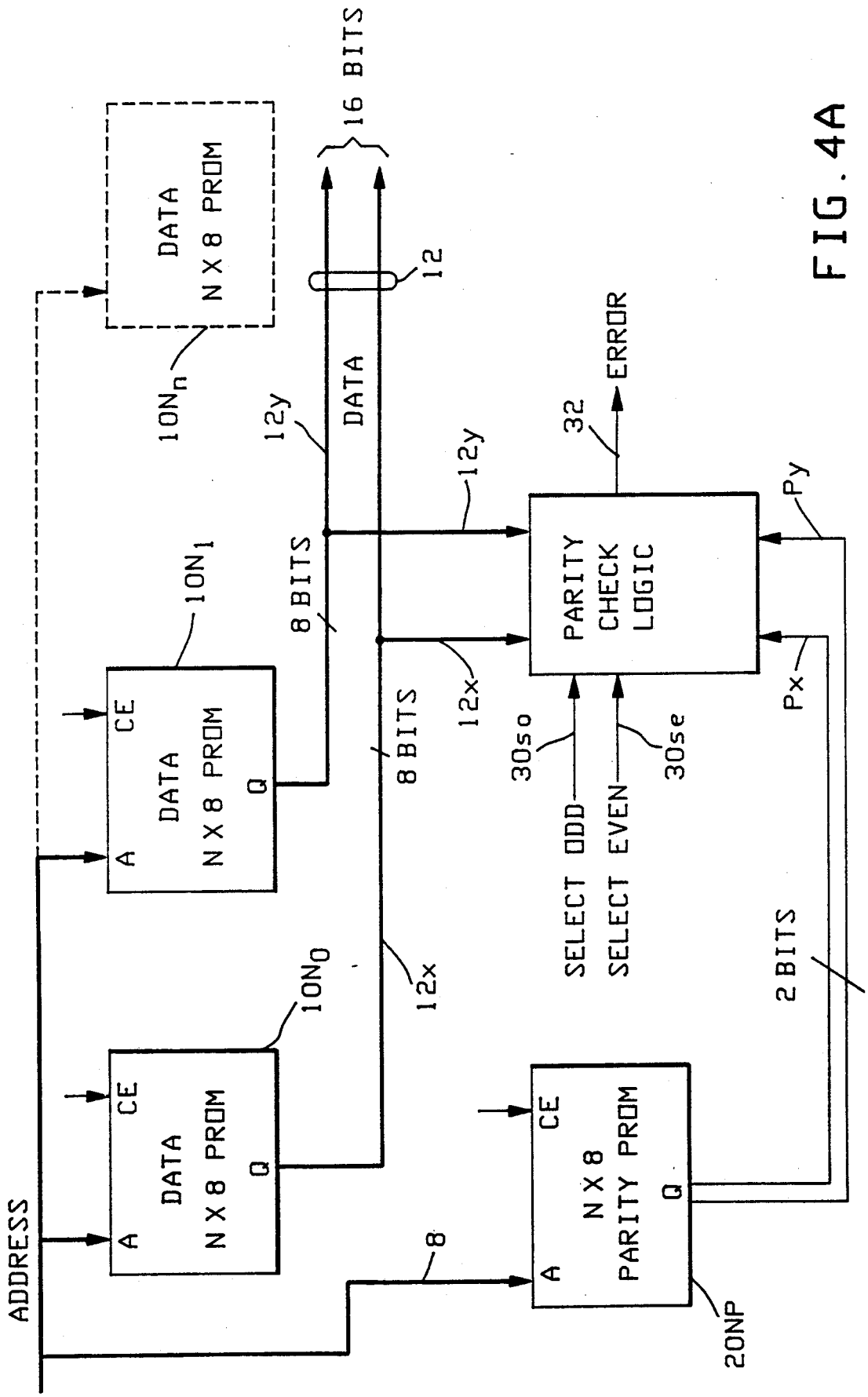
FIG. 4A is a block diagram showing the memory system expanded in width laterally in order to provide more data bits than would normally be provided by one memory chip module.

Referring to FIG. 4A, there is seen a PROM memory system which is laterally expanded in width. This memory structure permits the output data to be increased in size from eight bits to sixteen bits by use of a lateral expansion in PROM chips using chip $10N_o$ and chip $10N_1$. The address bus 8 addresses data bytes in the data chips $10N_o$ and $10N_1$ in addition to addressing locations in the parity PROM chip 20NP, and then subsequently the data byte from data PROM $10N_1$ would be accessed together with the correspondingly appropriate parity bit from the parity PROM 20NP.

The data PROM $10N_o$ of FIG. 4A provides eight bits of data on bus $12_x$ while PROM $10N_1$ provides eight bits of data on bus $12_y$ which then constitutes the sixteen bits of data output on bus 12.

The parity check logic 30 of FIG. 4A is seen to receive accessed data bytes from PROMs $10N_o$ and $10N_1$ via buses $12_x$ and $12_y$ in order to calculate the parity of the 16 bits accessed. Parity logic 30 also receives the related parity bits from parity PROM 20 NP on lines $P_x$ and $P_y$ for comparison with the calculated parity in order to set an error signal on line 32 if an incongruity occurs. The system permits the versatility of choosing either odd or even parity values by the selection inputs $30_{so}$ and $30_{se}$.

Figure 4B:
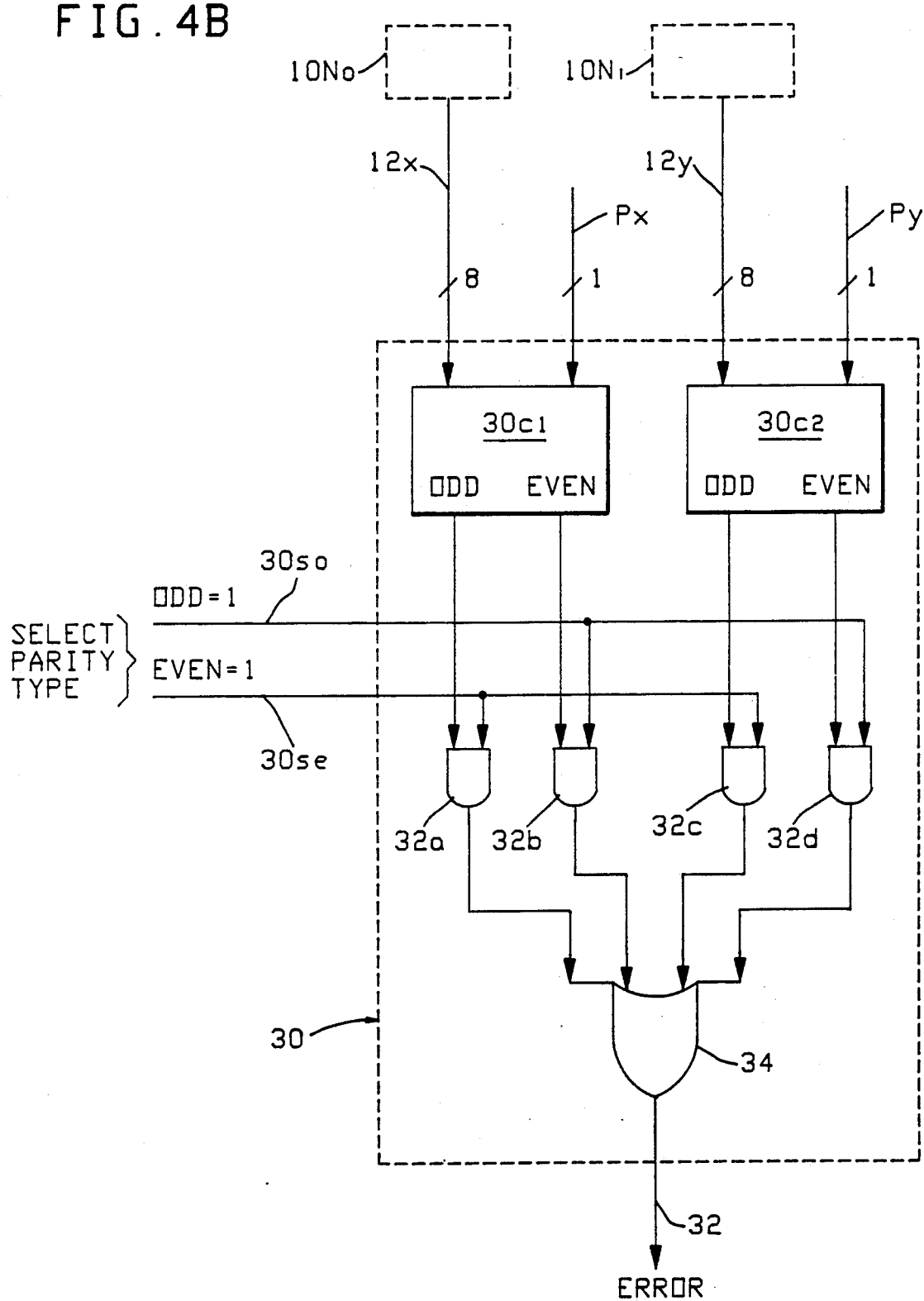
FIG. 4B is a schematic example of parity check logic.

FIG. 4B is a diagram of a circuit useful for the parity check logic 30 of FIG. 4A. Commercially available parity generators as $30_{c1}$ and $30_{c2}$ are available from suppliers (such as the aforementioned Fairchild Camera and Instrument Co. Digital Division) which can be combined with AND gates $32_a$, $32_b$, $32_c$, and $32_d$, which each receive one input from the multiplexer chips and one input from the parity selection lines. Outputs of the AND gates $32_{a,b,c,d}$ feed to the OR gate 34 which has the error output line 32. FIG. 4B shows the odd-even selection circuitry unit 30 which provides the flexibility for expansion of the memory system while at the same time permitting choice of odd or even parity operation. Thus with reference to FIG. 4A, it can be seen that the 8 bit bus $12_y$ and the 8 bit bus $12_x$ can feed at total of 16 bits of input into the circuit unit 30 of FIG. 4B. Thus the circuitry illustrates the expansion possibilities of this combination as more buses of 8 bits are added into the system, the parity check logic 30 is able to handle the requirements.

By "extrapolating" this FIG. 4A in the lateral direction, it can be seen that the architectural structure can be widened to provide 64 bits (8 bytes) of data in width (64-bit data word) while the same parity PROM 20NP can be used to support the appropriate parity bits required without adding any additional parity PROM units.

Figure 5:
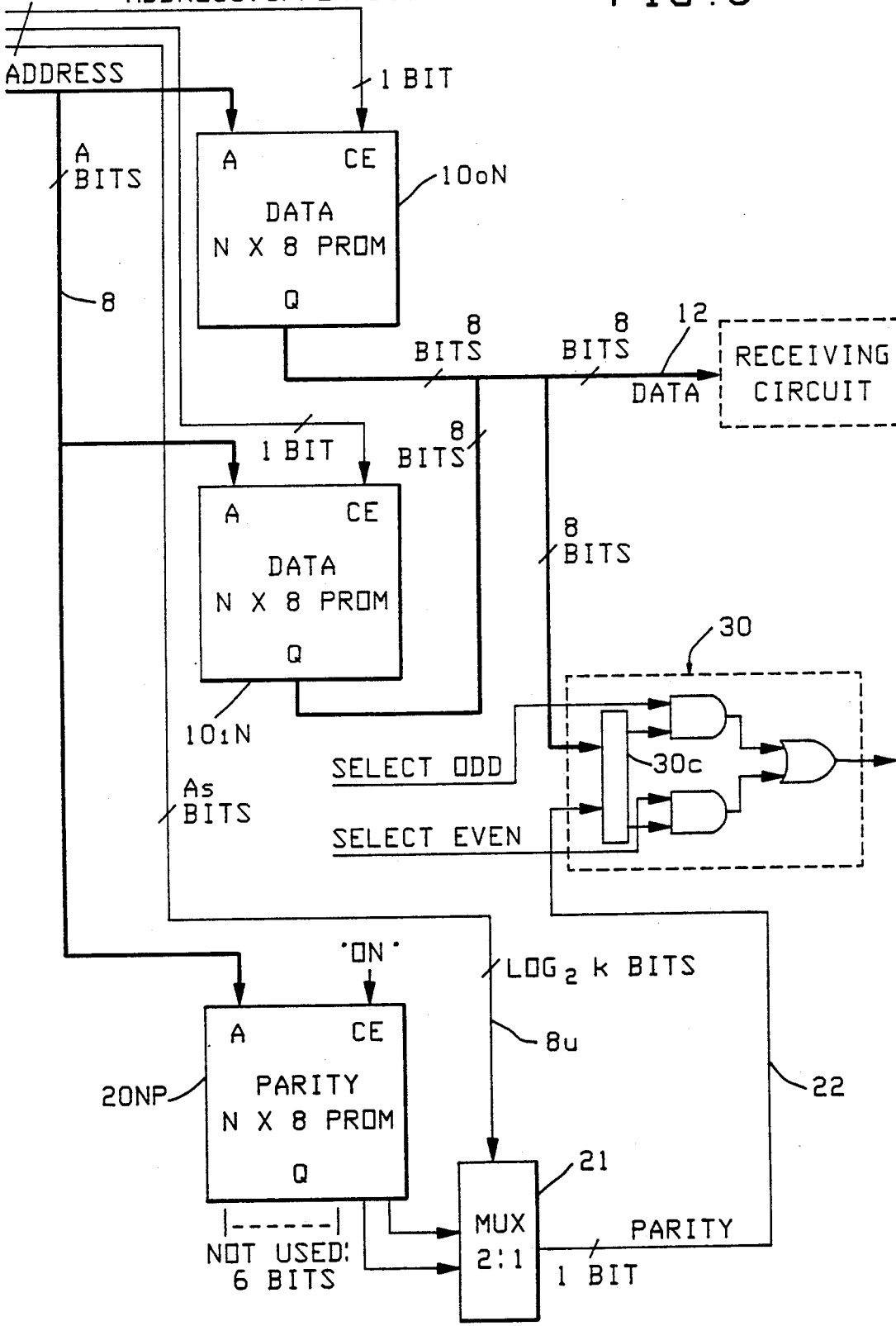
FIG. 5 is a block diagram showing the architecture by which the memory system can be vertically expanded while still requiring only one uniformly similar parity PROM chip.

Referring to FIG. 5, there is seen a PROM memory structure which has been expanded in depth vertically from "N" thousand bytes deep up to "2N" thousand bytes deep while still keeping the width at the level of eight bits for a data byte. It should be noted that only one parity bit is required for each data byte in each of the data PROMs of the memory. Further, the architecture requires only one parity PROM 20NP for this expanded structure which shares the single chip parity PROM 20NP. The only additional requirement is a very inexpensive "Quad 2-1 Multiplexer" chip such as that manufactured by Fairchild Camera and Instrument Co. of So. Portland, Me. and designated as type 74157. The quad multiplexer chip 21 is used to accept the two output parity bits from chip 20NP and select the appropriate parity bit for output on line 22. The multiplexer in FIG. 5 is designated as element 21 while the data PROMs are designated as $10_{0N}$ and $10_{1N}$.

The data PROMs are connected as a matrix having the address line 8 which also is fed to the parity PROM 20NP. There is an upper address line $8_u$ which enables one data PROM at a time through the chip enable input, CE. Additionally, the upper address line $8_u$ also selects one of the two parity bits which are received through the multiplexer chip 21 in FIG. 5.

The upper bit address lines $8_u$ of the address bus 8 only require a "one-bit" line in the case shown of two PROMs where k=2 represents the number of data PROMs. If "k" data PROMs were used, then the upper bit address lines $8_u$ would require $A_s$ lines where $A_s = \log_2 k$. The upper bit address lines of the address bus in FIG. 5, while shown as multiple lines (of $A_s$ bits) are split off by a commonly used decoder unit (known in the art) into individual bit lines which are fed to the chip enable inputs of the prom $10_0N$ and $10_1N$. Thus the upper bit address lines of $A_s$ bits are multiple numbers of lines which are individually fed to each of the PROMs involved. However, the line $8_u$ is the number of $A_s$ bit lines which feed to the multiplexer 21 in order to provide for selection of the appropriate output parity bit on line 22.

In FIG. 5, the parity check log circuit 30 is preferably made with a combination of two AND gates and one OR gate with a commercially available parity checker generator $30_c$ which receives the 8-bit accessed data word and the related parity bit. The type of parity system (odd or even) is selected through inputs $30_{so}$ or $30_{se}$. FIG. 5 shows the circuitry 30 which is capable of handling 8 bits of input data from bus 12. This circuitry 30 is a subset of FIG. 4B which shows a odd even parity selection circuit which is capable of handling 16 bits. That is to say the chip $30_{c1}$ handles 8 bits and the chip $30_{c2}$ handles 8 bits to provide for handling a total of 16 bits of input data. Thus FIG. 4B shows the "expansion" possibilities which are available with the use of the circuit 30 in FIG. 4B whereby multiple groups of 8 bits may be fitted into the circuit as required.

Figure 6:
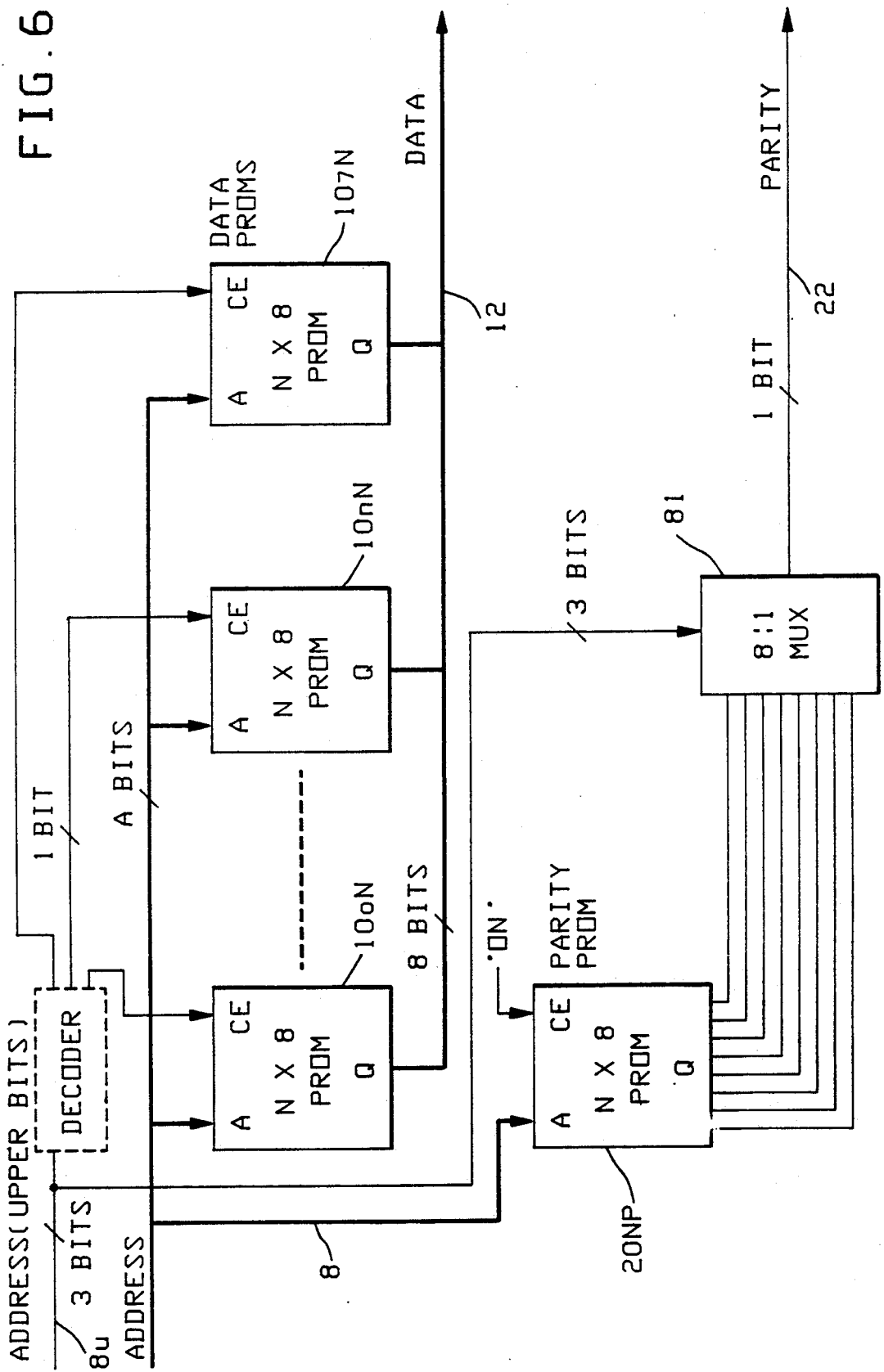
FIG. 6 is a block diagram showing the architectural arrangement expanded vertically in depth to provide maximum depth expansion using a single 8-bit output parity PROM chip.

The previously described minimum structure of FIG. 3 is shown in an expanded form in FIG. 6 where the vertical depth of the memory system has been expanded to "8N" thousand bytes deep. This architectural arrangement can provide for expansion to this depth without the need for adding any additional parity PROM chips other than the initial parity PROM chip.

The vertically arranged data PROMs N×8 are shown as $10_{oN}$, $10_{nN}$, $10_{7N}$ wherein each of these data PROMs is addressed by the address bus 8 which also addresses the parity PROM 20NP. Additionally, the upper bit address lines of three bits, designated as bus $8_u$, is used to reach the chip enable inputs of the data PROMs. As seen in FIG. 6, there are individual bit lines which go to each chip enable (CE) of each PROM on an individual basis. The chip enable to the parity PROM 20NP is continually energized. The three bit lines which go to the multiplexer 81 are used to select the one particular bit required for output on the output line 22. The address lines bus $8_u$ is also used to activate the multiplexer 81 which has eight inputs and one output to provide the parity output line 22.

In this structure, the upper three-line address ($A_s=3$) bits bus $8_u$ selects which of the eight data PROMs is to be enabled and additionally it selects (via multiplexer 81) which one of the eight parity bits, from parity PROM 20 NP, is used. The data PROMs are connected as a matrix. The lower address lines on bus 8 (composed of "A" bits) are the common address lines. The data lines of data output bus 12 are common with only one data PROM enabled at a time. The upper address lines $A_s$ of the bus $8_u$ select which data PROM is active. The upper address lines of bus $8_u$ also select which of the eight parity PROM bits is used as the related parity bit by selection via an inexpensive 8-1 multiplexer chip 81.

The one-bit parity line 22 and the eight bits of the output data bus 12 would provide inputs to the parity check logic 30 as shown in FIG. 5.

Figure 7:
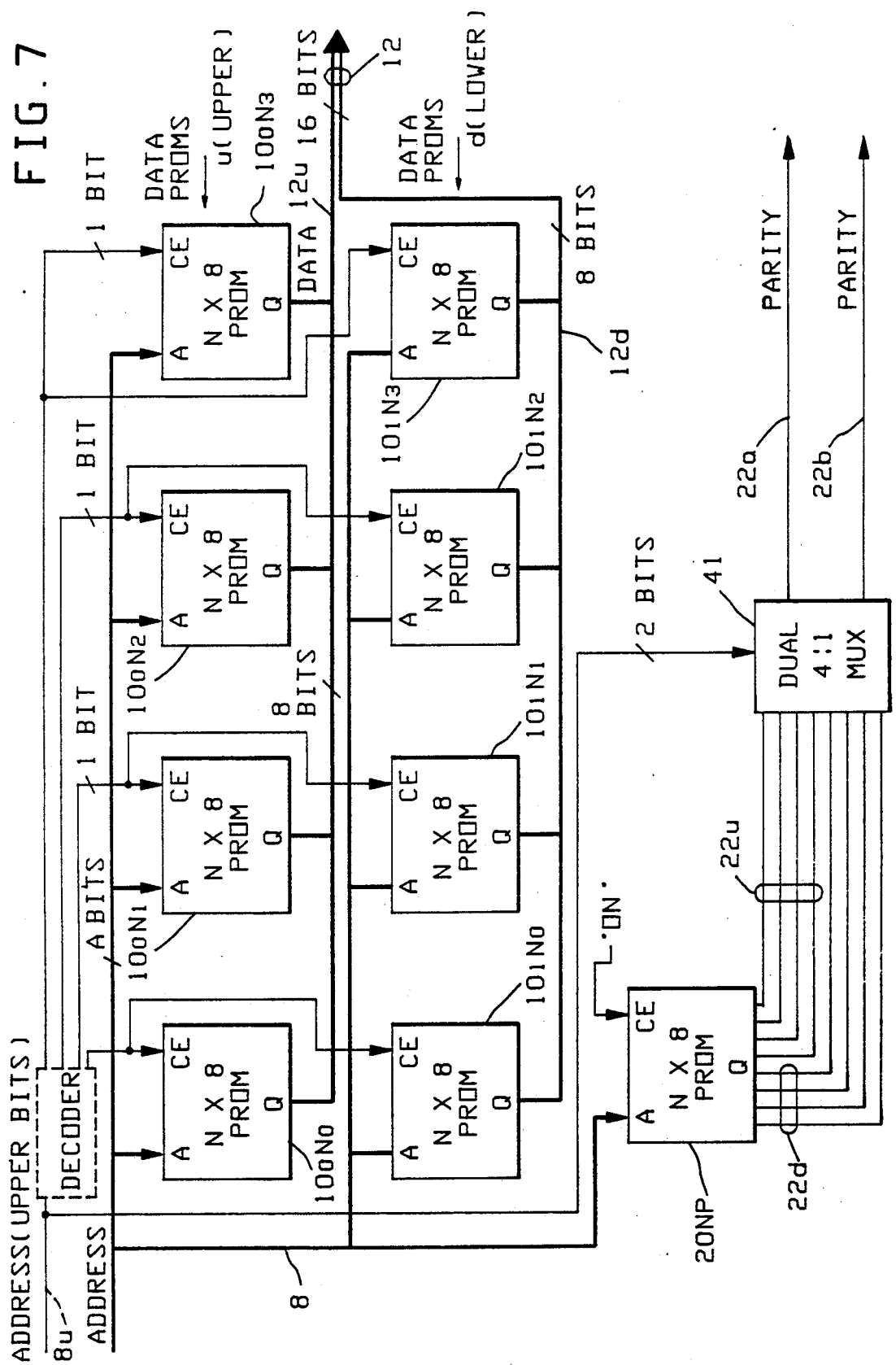
FIG. 7 is a block diagram of an architectural arrangement of a memory system which is expanded laterally in width and also expanded vertically in depth.

The structure of FIG. 7 shows a PROM memory system expanded both by width expansion and depth expansion at the same time. It may be noted that since all the PROMs (data PROMs and parity PROM) are eight bits wide, the structure can be expanded up to the condition that the multiplication of the width times the depth comes to a value of 8. Thus, up to this level of expansion, then still only a single PROM parity chip 20NP is needed.

Thus, in FIG. 7 there is seen an upper group "u" of data PROMs $10N_o$ through $10_oN_3$ which work in combination with a second group of data PROMs designated "d" or lower group of data PROMs. This lower group of data PROMs "d" are designated $10_1N_o$ through $10_1N_3$. Similarly, the address bus 8 is connected to each one of the data PROMs in addition to the single parity PROM 20NP. The data output line 12 functions to take eight bits from a selected PROM in the upper group and eight bits from a selected PROM in the lower group to provide an output of 16 bits.

The parity PROM 20NP has eight outputs which are separated into an upper group of 4-bit lines $22_u$ and a lower group of 4-bit lines, $22_d$. These are fed into the dual multiplexer 41 which is a device for selecting one parity bit from the upper group of four on bus $22_u$ and one parity bit from the lower group of lines on bus $22_d$. Thus the appropriate parity bit from the upper group of data PROMS will appear on line $22_a$ while the appropriate parity bit from the lower group of data PROMs will appear on line $22_b$. Thus, similarly to that shown in FIG. 4A, the two data bytes accessed from the upper and lower PROM groups are fed to parity check logic 30 and the two parity bits on lines $22_a$ and $22_b$ of FIG. 7 are fed also to the parity check logic 30 for integrity checking.

The upper address bits on bus $8_u$ select via a standard decoder unit, which one of the four vertical data PROM banks is enabled, via a standard decoder-that is to say, These upper address bits also select via Mux 41 which of the four parity bits from each group of the parity PROM 20NP will be selected and used for the output parity lines $22_a$ and $22_b$. This is done by means of the multiplexer 41 which is controlled by the bus lines $8_u$ of address bus 8.

If the expansion is desired to go in both directions beyond "eight banks" of data PROMs, then, of course, there would be required an additional parity PROM chip, since more than 64 parity bits would be required.

It should be indicated that, in regard to parity checking systems, the PROM parity values can be selected to be an "odd parity" system or an "even parity" system. The value of a parity bit is calculated by counting the number of "ones" in the data byte. For example, if the data byte should read 11000111, this would be seen to have five 1's in the data byte. Taking this number of "1's", the "parity bit" is then made to be a "1" or a "0" to make the total number either an "even" number or an "odd" number, depending upon which type of parity system (odd or even) has been selected for use.

The following Table I is shown to indicate some examples of data words and the corresponding values of the parity bit required using the even parity system or the odd parity system.

TABLE I

| PARITY BIT REQUIRED ACCORDING TO TYPE OF PARITY SYSTEM USED | | |
|---|---|---|
| DATA WORD | REQUIRED PARITY BIT | |
| VALUE | EVEN | ODD |
| 00000000 | 0 | 1 |
| 11100010 | 0 | 1 |
| 11100000 | 1 | 0 |
| 11111111 | 0 | 1 |

It should thus be understood that the architectural structures of this disclosure can work with either odd or even parity schemes. Only the predetermined values stored in the parity PROMs will vary with the particular scheme used.

Figure 8:
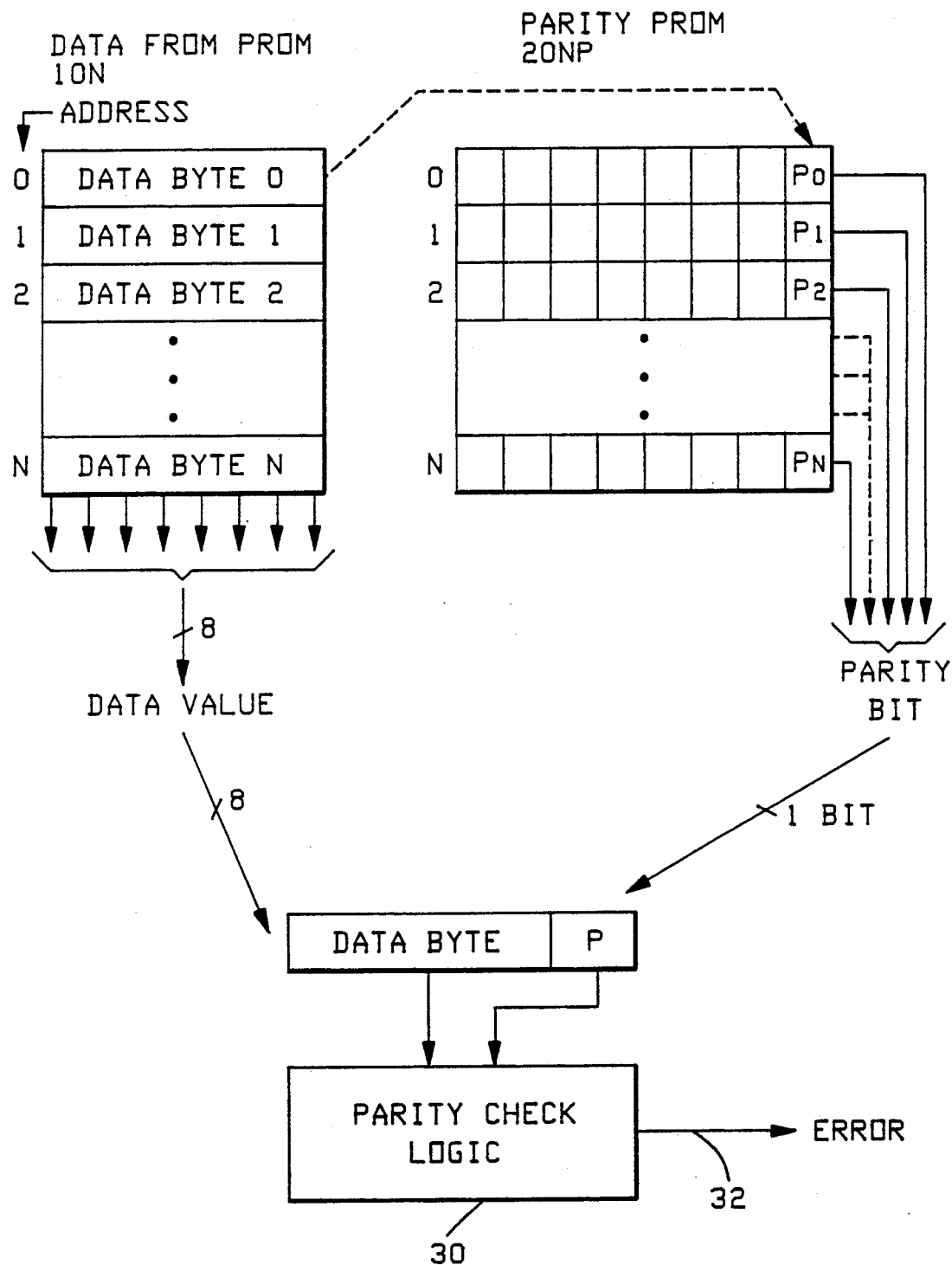
FIG. 8 is a schematic drawing showing the minimum structure involved for a PROM memory having N+1 data bytes and working with a uniformly similar auxiliary parity memory module having N+1 parity bits.

FIG. 8 is a schematic diagram showing a data PROM having N data bytes which works in correspondence with a parity PROM which provides a predetermined parity bit for each data byte of the data PROM.

Then subsequently, the selected data byte from the data PROM will be read out and fed to the parity check logic which will calculate what the parity value is of the data byte which was received. Then simultaneously, the appropriate parity bit from the parity PROM will be read out as P and also fed to the parity check logic 30. The parity check logic 30 will compare the recalculated parity value of the data byte and compare it with the preset parity value from the parity PROM to make sure that these two values correspond to each other. Otherwise an error signal will occur at line 32.

Basically, FIG. 8 shows the parity bits for a minimum structure. Also, it may be noted that since there is only a single parity bit required for any given byte of data, then any bit position in the parity PROM could have been chosen and used. As each data byte from the data PROM is read out, the corresponding parity byte (and selected bit) is derived from a corresponding parity PROM location and read out. Thus, for each byte of data stored in the data PROM, there is a corresponding parity "bit" stored in the parity PROM, but only one bit of this byte is used in the minimum configuration.

Figure 9:
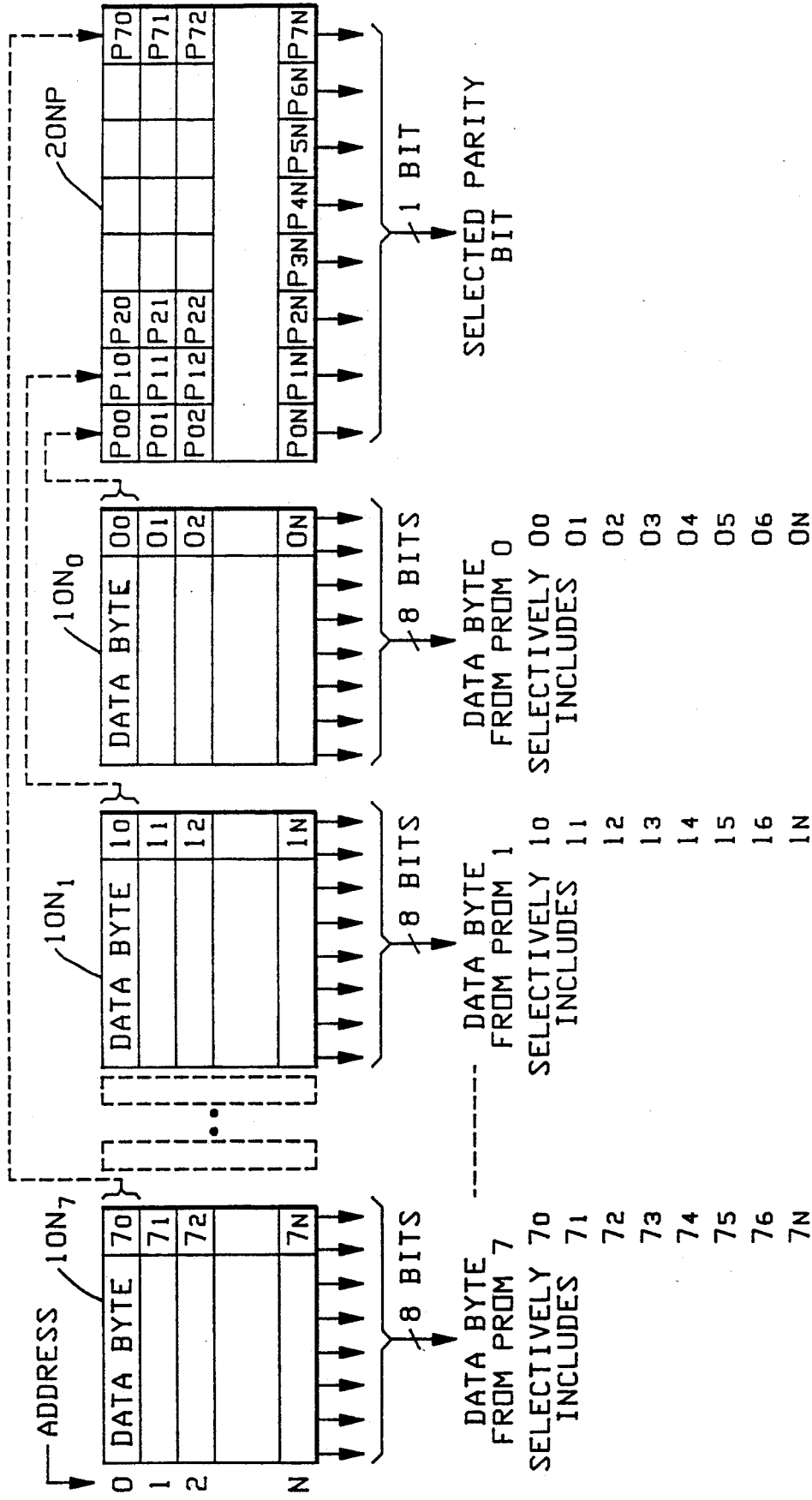
FIG. 9 is a schematic diagram showing a multiple number of laterally (width) expanded data PROM memories where each PROM memory has N+1 data bytes and each data byte is correlated to a particular location for the appropriate parity value in the parity PROM memory.

Referring to FIG. 9, there is seen a schematic drawing of the width-expanded memory system where a series of eight PROM chips $10N_o$, $10N_1$, ... $10N_7$ are placed in a lateral width-expansive architecture and where each of the data PROMs holds $N+1$ data bytes. However, it can still be seen that only one single parity PROM 20NP is still required. The parity PROM is now more fully and completely utilized in that every single one of the parity data bytes in the parity PROM is now selectively used since there is one parity bit for each byte of the data bytes in the data PROMs of the expanded width memory system.

As each data word of eight bytes is read, the related corresponding parity byte containing the necessary eight bits of parity is also read and the appropriate parity for a given data byte is selected to correspond with the appropriate data byte read out from the particular PROM involved. For example, if data byte $1_o$ is addressed and accessed, then the parity bit $P1_o$ would be accessed also as the correspondingly related parity bit.

Figure 10:
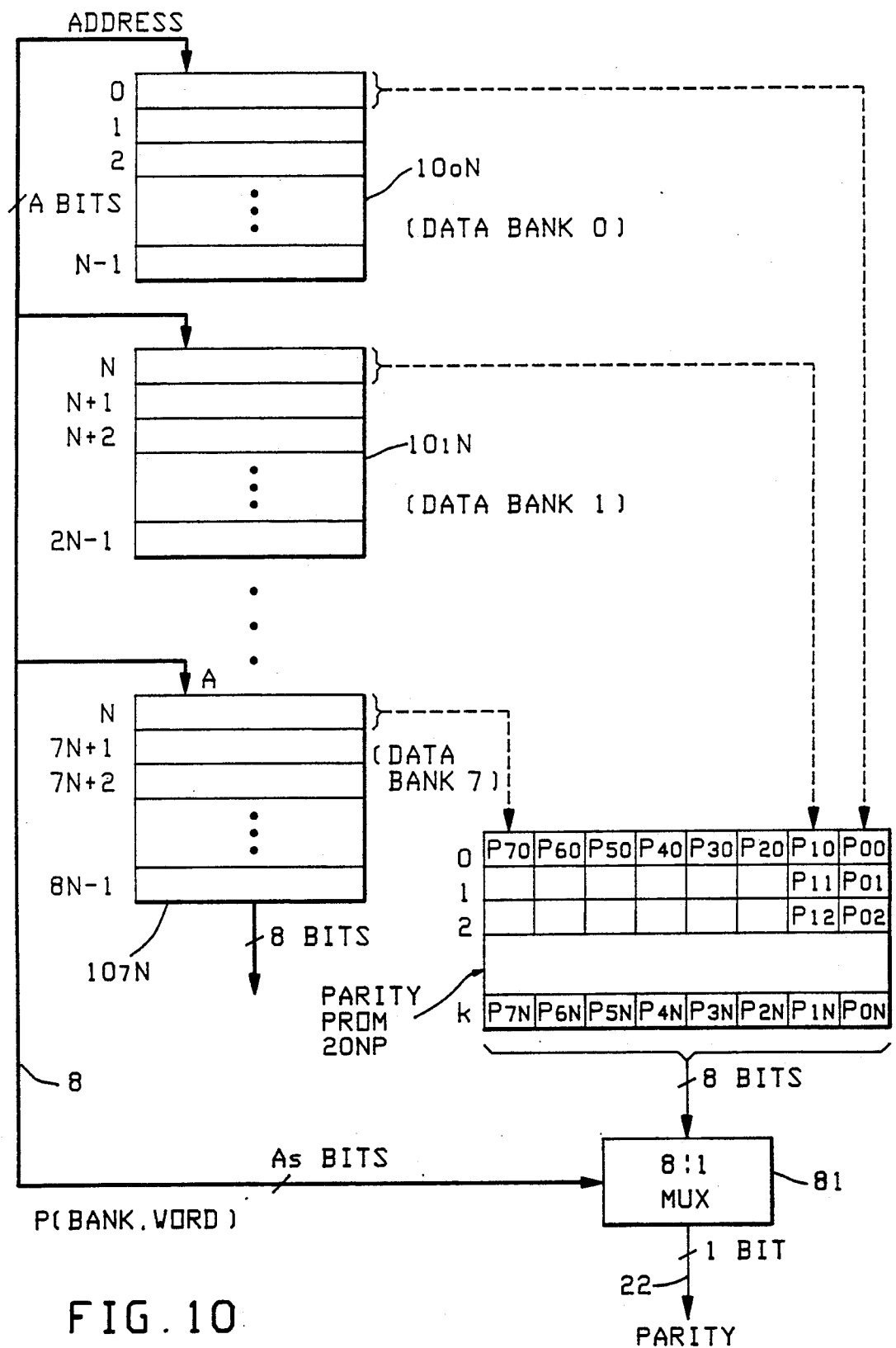
FIG. 10 is a schematic drawing showing a plurality of PROM memory data banks expanded vertically while being supported by a parity PROM which supplies a particular parity value for each data byte in the system.

FIG. 10 shows the memory structure expanded vertically in depth to eight PROMs deep. Here again, the single parity PROM 20NP is sufficient to handle the architecture. As seen in FIG. 10, each parity bit position in the parity byte of the parity PROM corresponds to one bank of the data PROM arrangement. The arrangement is such that the first PROM data bank 0 is designated as $10_{ON}$. The second data bank 1 is designated as $10_{1N}$. The final data bank 7 is designated as $10_{7N}$.

The vertical expansion should be noted as indicated where the first data bank has data bytes 0 through N-1, the second data bank 1 has data bytes N through 2N-1, ..., the eighth data bank, $10_{7N}$, carries data bytes 7N through 8N-1.

Corresponding to each of these particular data words in each of the particular data banks, there is a particular parity bit in the parity PROM 20NP. For example, the data byte 0 of the data bank 0 corresponds to the parity bit $P_{oo}$. The data byte N in data bank $10_{1N}$ corresponds to the parity bit $P_{10}$ of the parity PROM 20NP The initial data byte 7N of the data bank $10_{7N}$ corresponds to the parity bit $P_{70}$ of the parity PROM 20NP.

The most significant three bits ($A_s$) of the address lines on address bus 8 allow eight PROM data banks to be read from. These three bits of address ($A_g$) the bus 8 also control a multiplexer chip 81 which steers the appropriate related parity bit required onto the parity line 22.

Since the number of data bank PROMs is 8 (k=8), thus $A_s$=3 bits, where the required upper address bits are $A_s = \log_2 k$ which in this case is three upper bit lines. Since one "Parity PROM" chip can only provide parity bit values for a limited number, N, of data bytes stored in the "k" data PROMs (because of the duplicative type-size nature of the Parity PROM chip), the configuration of the number of groups "g" together with the number "k" of "data PROMs" will be limited, so that the number of groups "g" can be only n/x, n/2, n/4, n where n is the number of bits in a byte. Here "x" represents the number of data chips in each of the "g" groups. The single parity PROM is limited in its size to N by n, thus allowing one parity bit value for each one of the N bytes in each one of the "k" data PROM's. The expansibility limitation could, of course, be overcome by adding another duplicate type "Parity PROM chip" which would then double the size of "k" (data chips) and also double the value of the "g" number of groups.

Described herein has been a simple low cost expandable memory structure which includes the use of a parity PROM shared by multiple numbers of data PROMs, and capable of selecting the appropriately related output parity bits for each accessed data word. The number of PROMs to the structure for parity storage can be reduced to a minimum or in many cases can operate with only one 8xN parity PROM, and the memory structure can support usage of odd or even parity systems as a choice.

Since PROM memory structures generally contain highly critical data information to the proper operation of a computer system, the ability to detect any data alteration or corruption with such a minimal added cost is deemed to be highly desirable.

In regard to the actual parity values which are preset and stored in the parity PROM, these can be easily calculated by a software program at the time that it prepares the actual data bytes for storage. This is generally done through the process called "PROM burning". Since simple software programs can be written to create the parity PROM values from the data byte values, no hardware costs are involved once the described system is built and loaded with its required information.

While the above described low cost, efficient and uniform architectural system for data integrity has been described in its basic formulation, it should be understood that the concepts and architecture presented may also be implemented through other structures but which may still fall within the definition of the claims attached hereto.

What is claimed is:

1. A memory structure storing unalterable data bytes and having parity check functionality, comprising:
    (a) a first plurality of uniform-sized type memory modules connected in lateral parallel configuration wherein each module is connected to a first common output data bus;
    (b) a second plurality of uniform-sized type memory modules connected in lateral parallel configuration wherein each module is connected to a second common output data bus;
    (c) accessing means for simultaneously reading out a first and second data byte respectively from said first plurality and from said second plurality of memory modules, and for reading out from a parity memory module, a first and second parity bit related to said first and second data bytes;
    (d) said first and second output data buses for providing a final output word which includes said first and second data bytes;
    (e) parity checking logic means for checking parity of each data byte accessed and including:
        (e1) selection means for using either an odd or even parity check relationship;
    (f) said parity memory module including a single memory module of said uniform-sized-type for storing a fixed unalterable parity bit value for each data byte in each of said memory modules.

2. The structure of claim 1 wherein said accessing means includes:
    (c1) addressing means connected to each one of said uniform-sized memory modules and to a multiplexer means for enablement of said memory modules and said multiplexer means.

3. The structure of clam 1 wherein said parity memory module includes:
    (a) an output parity line for each one of said memory modules in said first and second plurality of memory modules.

4. The structure of claim 3 wherein said accessing means includes:
    (a) said multiplexer means for selecting which ones of said output parity lines will be enabled to provide a parity bit output signal to said parity check logic means.

5. The structure of claim 1 wherein each of said memory modules is a PROM holding "N" data bytes where each data is "n" bits wide.

6. The structure of claim 1 wherein said final output word is composed of twice the number of bits residing in each accessed data byte.

7. The structure of claim 1 wherein said parity checking logic means includes means for comparing each of the final output data bytes parity value with the appropriately related parity bit values associated with each output byte to sense whether a parity error has occurred.

8. A parity checking system for checking the integrity of data read out of a ROM/PROM memory structure comprising:
   (a) a ROM/PROM memory structure having a plurality of uniformly sized ROM/PROM modules for holding data bytes, said plurality of ROM/PROM modules forming a first connected group of memory modules which provides a first output data byte and a second connected group of uniformly sized modules which provides a second output data byte;
   (b) a parity ROM/PROM having the same uniform size and type as said ROM/PROM modules in said memory structure, said parity ROM/PROM storing one predetermined related parity bit for each data byte in each addressable location of said plurality of ROM/PROM memory modules;
   (c) means for addressing a selected data byte in the same corresponding location in each of said connected groups and correspondingly selecting the related parity bits in said parity ROM/PROM for application to a parity logic means;
   (d) said parity logic means for determining if the selected related parity bits match the internally calculated parity bit value of each accessed data byte.

9. The system of claim 8 wherein said means for correspondingly selecting said related parity bit includes:
   (a) multiplexer means controlled by the address on an address bus means;
   (b) address bus means for selectively accessing any stored data byte in any one of said ROM/PROM modules while simultaneously enabling access to said related parity bit.

10. The system of claim 8 wherein said parity logic means includes:
   (a) selection means for enabling usage of either one of an odd or even parity format.

11. A length-width expansible memory structure of duplicated PROM/ROM memory data units for storing and accessing selected data bytes with reliability, said memory structure comprising:
   (a) means for connectively attaching and addressing multiple rows and/or multiple columns of said duplicative PROM/ROM memory data units;
   (b) a plurality of common bus means for enabling a plurality of data byte outputs from selected memory data units to be accessed;
   (c) a parity PROM/ROM memory unit which duplicates in type and size said PROM/ROM memory data units and stores a predetermined non-alterable parity bit for each data byte in said memory structure;
   (d) means for parity checking each accessed data byte and for selecting whether an odd or even valued parity format will be operative.

12. A memory structure of multiple uniform-sized PROM/ROM memory data modules in a matrix row-column configuration and having parity-check functionality, said memory structure comprising;
   (a) a plurality of y rows of uniform-type-size memory data modules wherein each module connects to an output data bus common to that row, and forms a plurality of paralleled output data busses;
   (b) a plurality of x columns of said uniform-type-size memory modules;
   (c) wherein each of said uniform-type-size memory modules hold N unalterable bytes of n bits each;
   (d) a parity memory module of said uniform-type size for holding a predetermined parity bit, for each of said XyN n-bit bytes in said memory data modules;
   (e) means for accessing a selected byte inthe same corresponding location in each said memory data module of the same column;
   (f) means for accessing a parity bit value from said parity memory module which relates to each byte selected for output on said output data bus;
   (g) means for parity checking each said accessed data byte on said output data bus.

13. A parity checking memory structure which determines the integrity of data accessed from a ROM/PROM memory structure comprising:
   (a) a memory structure having k units of uniform type-sized data memory chips wherein each one of said k data memory chips includes:
      (a1) N addressable data storage locations where each location holds a data byte of "n" bits;
      (a2) connection means for addressing said data memory chip and enabling the accessed data to be output on a common data output bus;
   (b) "g" groups of said data memory chips where each group is of "x" PROM data memory chips and is connected to its common data output bus, said number of groups "g" being limited to the size of an associated parity PROM chip which holds N n parity bits such that "g" can have a value of n, n/2, n/4 or n/x when x does not equal n;
   (c) common output data bus means providing a common data output bus for each group of said data memory chips wherein any plurality of said common output data bus means forms a final output data bus supplying a final output word of g n bits;
   (d) said associated parity ROM/PROM chip of a type and size which duplicates each of said data memory chips, said parity ROM/PROM chip including;
      (d1) means for storing one predetermined and unalterable parity bit for each of said N bytes in each of said "k" data memory chips;
      (d2) "n" parity bit output lines for transmitting selectively addressed parity values to a multiplexer means;
   (e) said multiplexer means for selecting the parity bit values, related to the accessed data bytes placed on each of said common data output bus; for transmission to a parity logic means;
   (f) said parity logic means for checking said related parity bit values against the internally calculated parity value of each accessed data byte, said parity logic means including:
      (f1) selection means for choosing either odd or even parity check format.

14. The structure of claim 13 where "N" is 2,048 locations of data bytes and "n" is equal to 8 bits.

15. The structure of claim 14 where "g" is two groups, "k" is 8 data chips and said parity PROM chip holds 2,048×8 parity bits.

16. The structure of claim 15 where said multiplexer means selects two (g=2) related parity bits for output to said parity logic means.

* * * * *